United States Patent
Rubel, Jr. et al.

(10) Patent No.: US 7,171,940 B2
(45) Date of Patent: Feb. 6, 2007

(54) HEAT SHIELD FOR ENGINE MOUNT

(75) Inventors: William T. Rubel, Jr., West Chester, PA (US); Richard Paoline, Jr., Downingtown, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/316,313

(22) Filed: Dec. 21, 2005

(65) Prior Publication Data

US 2006/0138300 A1 Jun. 29, 2006

Related U.S. Application Data

(60) Provisional application No. 60/639,384, filed on Dec. 27, 2004.

(51) Int. Cl.
*F02B 77/11* (2006.01)
*F16M 13/00* (2006.01)
*F16M 1/00* (2006.01)

(52) U.S. Cl. .................. 123/198 E; 248/560; 428/137

(58) Field of Classification Search ............ 123/198 E; 428/293.4, 137, 138; 248/560, 638
See application file for complete search history.

(56) References Cited

U.S. PATENT DOCUMENTS

| | | | | |
|---|---|---|---|---|
| 5,080,949 A | * | 1/1992 | Nawrocki et al. | 428/75 |
| 5,656,353 A | * | 8/1997 | Butler | 428/133 |
| 5,704,598 A | * | 1/1998 | Kojima | 267/140.13 |
| 5,958,603 A | * | 9/1999 | Ragland et al. | 428/595 |
| 6,120,011 A | * | 9/2000 | Maeno et al. | 267/140.11 |
| 6,129,328 A | * | 10/2000 | Knurek et al. | 248/638 |
| 6,994,901 B1 | * | 2/2006 | Chen et al. | 428/121 |
| 2003/0214085 A1 | * | 11/2003 | Makino et al. | 267/140.12 |
| 2004/0245690 A1 | * | 12/2004 | Winkler et al. | 267/140.13 |

FOREIGN PATENT DOCUMENTS

| DE | 3214997 A | * | 11/1983 |
|---|---|---|---|
| JP | 2002088203 A | * | 3/2002 |
| JP | 2004106652 A | * | 4/2004 |
| KR | 2002043377 A | * | 6/2002 |

* cited by examiner

*Primary Examiner*—Stephen K. Cronin
*Assistant Examiner*—Arnold Castro
(74) *Attorney, Agent, or Firm*—Robert L. Stearns; Dickinson Wright PLLC

(57) ABSTRACT

A heat shield adapted to protect an engine mount is disclosed. The heat shield has a substrate positionable substantially surrounding the engine mount. The substrate has a heat reflecting surface facing outwardly away from the engine mount to block radiant heat transfer to the mount. An attachment member is attached to the substrate. The attachment member is positionable between the engine and the engine mount to fix the substrate in position. The invention further concerns a method including providing a heat shield formed of a flexible substrate, forming the substrate so as to surround the engine mount with the heat reflecting surface facing outwardly from the engine mount and attaching the substrate to the engine mount.

20 Claims, 3 Drawing Sheets

HEAT SHIELD FOR ENGINE MOUNT

FIELD OF THE INVENTION

This invention relates to heat shields for protecting flexible engine mounts from exposure to heat, and especially to heat shields for automotive applications.

BACKGROUND OF THE INVENTION

Automotive engine mounts typically comprise several blocks of viscoelastic material positioned between the engine and the frame of a vehicle. The viscoelastic material provides damping and isolates the engine from the frame with respect to vibration and shock. This form of flexible mounting protects the engine from shock and vibration transmitted to the frame from the vehicle's suspension system and also isolates the passenger compartment from vibration caused by engine operation.

Being close to the engine, the engine mounts are subjected to a harsh thermal environment. Heat is transferred to unprotected mounts by both conduction and radiation. When subject to such heat, the viscoelastic material tends to break down more rapidly, causing possible failure of the mounts. There is clearly a need for a shield that can be easily integrated with the engine mount and which can reduce both the conductive and radiant heat transfer to it from the engine.

SUMMARY OF THE INVENTION

The invention concerns a heat shield adapted to protect an engine mount. The engine mount is positionable between an engine and a support frame. The heat shield comprises a substrate positionable substantially surrounding the engine mount. The substrate has a heat reflecting surface facing outwardly away from the engine mount to block radiant heat transfer to the mount. An attachment member is attached to the substrate. The attachment member is formed of a heat insulating material and is positionable relatively to the engine mount. The attachment member fixes the substrate in the position surrounding the engine mount and reduces conductive heat transfer to the mount when positioned between the engine and the mount.

Preferably, the heat shield is formed from a woven glass fiber mat, but non-woven polyester is also feasible. The reflective surface preferably comprises a metal foil attached to the mat. The attachment member preferably comprises a fiber reinforced polymeric matrix laminate attached to a hinge element.

The invention further concerns a method of protecting an engine mount from heat of an engine. The method comprises:

providing a heat shield comprising a flexible substrate having a heat reflecting surface thereon, the heat shield having first and second attachment members, the attachment members being attached to the substrate in spaced apart relation;

forming the substrate so as to surround the engine mount, the heat reflecting surface facing outwardly from the engine mount; and attaching the first and second attachment members to the engine mount.

DETAILED DESCRIPTION OF THE EMBODIMENTS

Figure 1:
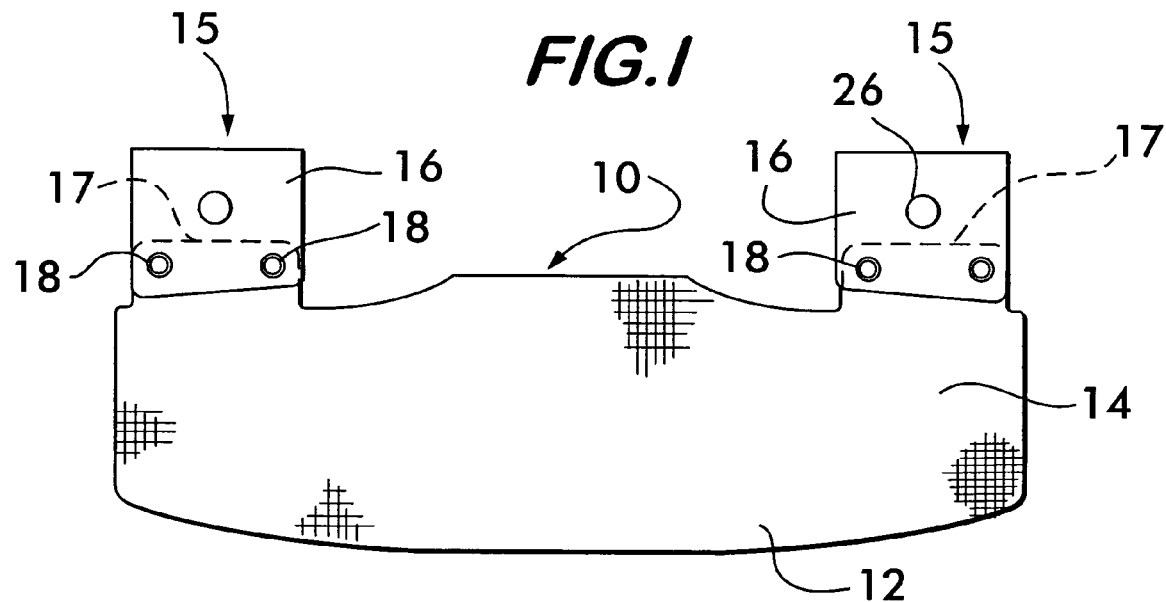
FIGS. 1 and 2 are plan views of a heat shield according to the invention.
Figure 2:
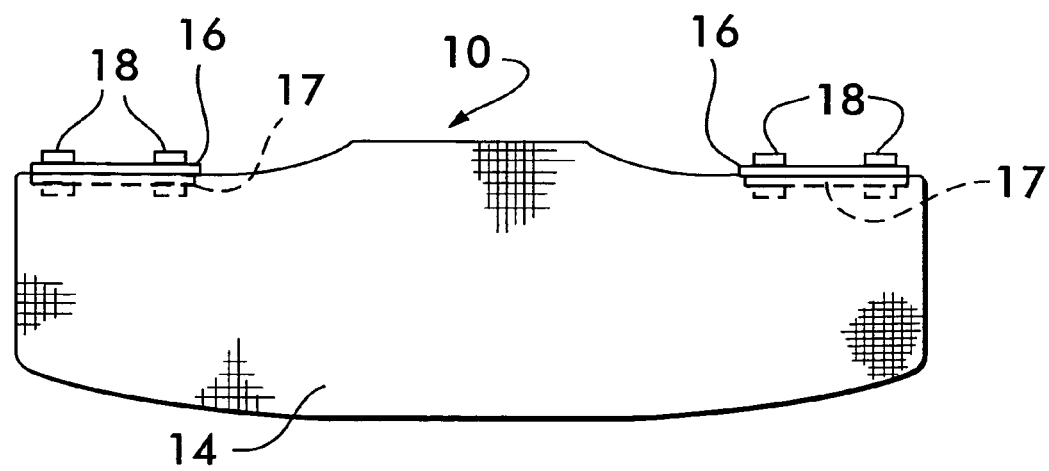

FIGS. 1 and 2 show a plan view of a heat shield 10 according to the invention. Heat shield 10 comprises a substrate 12 having a heat reflecting surface 14. One or more attachment members 15 are attached to the substrate. The attachment members are preferably made of a heat insulating material and effect the attachment of the heat shield 10 to an engine mount as described below. The attachment members may be integrally formed with the substrate (i.e., a portion of the substrate) or, for greater strength, the attachment members may comprise a tab 16 formed of a fiber reinforced polymeric matrix. Preferably, tabs 16 are hingedly attached to the substrate by a hinge element 17, allowing them to be pivoted relatively to the substrate as shown by a comparison of FIGS. 1 and 2. Hinge element 17 may be formed by a portion of the substrate which is cut and/or creased to allow the substrate portion to bend. By allowing the tabs to pivot, the hinge elements facilitate attachment of the heat shield to the engine mount.

Substrate 12 preferably comprises a woven glass fiber mat, although other tough, flexible temperature resistant materials, such as aramid filaments, non-woven polyester, or polyethylene terepthalate sheet, are also feasible. The reflecting surface 14 is preferably formed by a thin metal foil, such as aluminum, adhered to the substrate. It is also possible to form the reflecting surface from vapor deposited metal in a vacuum coating process. This is especially appropriate when the substrate is a homogenous sheet.

Attachment members 15 preferably comprise a tab 16 formed of the aformentioned fiber reinforced polymeric matrix laminate, which provides a tough, inexpensive heat insulating material. Other polymers, such as temperature resistant engineering plastics, are also feasible. In the example shown, the attachment members 15 comprise tabs 16 and hinge elements 17, the tabs being attached to the hinge elements of substrate 12 by rivets 18.

The substrate 12 with its reflective surface 14 is cut into a predetermined size and shape so as to substantially surround the engine mount. With the substrate in a flat configuration tabs 16 are readily attachable, for example, by automated machinery, thus providing manufacturing advantages. The flat configuration provides further advantages for handling and shipping, it being easier to handle, pack and ship a flat substrate as opposed to a curved one.

Figure 3:
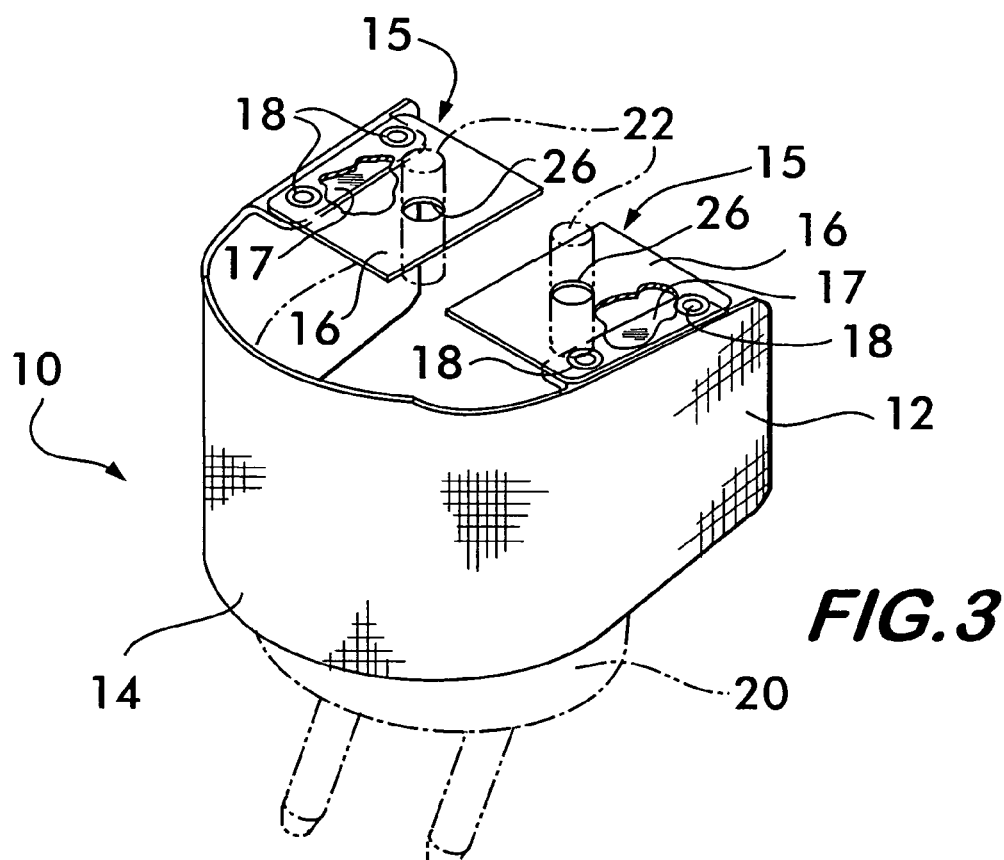
FIG. 3 is a perspective view of the heat shield shown in FIG. 1 mounted on an engine mount.
Figure 5:
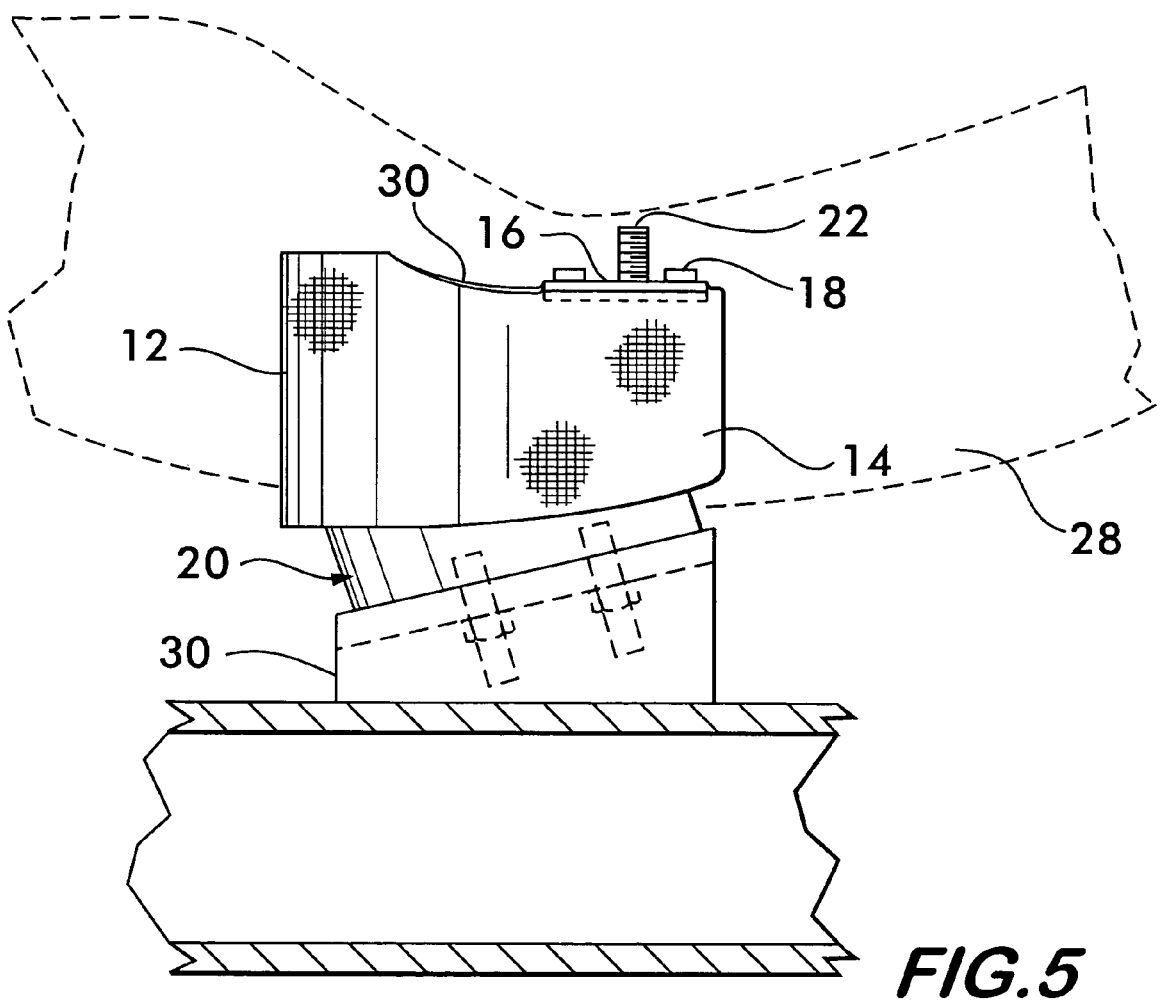
FIG. 5 is a side view of a heat shield according to the invention positioned on a frame.

As shown in FIG. 3, the heat shield 10 is mounted on an engine mount 20 using the tabs 16 to engage studs 22 that extend from the mount. Studs 22 engage either the engine or frame of the vehicle as shown in FIG. 5. The heat reflecting surface 14 faces outwardly away from the mount 20 to effectively block radiant heat. FIGS. 2, 3 and 5 show in detail how the tabs 16 are angularly positionable due to their hinged attachment to substrate 12 so that they engage the studs 22 but allow the substrate 12 to wrap substantially around the engine mount. The flexibility of the substrate 12 allows it to be formed by hand to adapt to the shape of a particular mount despite the fact that the substrate is formed from a flat blank of material.

As shown in FIG. 1, attachment members 15 are positioned in spaced relation to one another lengthwise along the substrate. The attachment members 15 have apertures 26 to engage studs 22. The attachment members may engage the mount 20 at either end and, thus will be captured either between the frame and the mount or the engine and the mount. Preferably, as shown in FIG. 5, the attachment members 15 are positioned between the engine 28 and the mount 20 rather than the frame 30 and the mount in order to reduce conductive heat transfer from the engine to the mount. When multiple attachment members are present, they all preferably engage the same end of the mount. This configuration allows the heat shield 10 to move with one end of mount 20 relatively to the opposite end when the mount compresses, elongates, and shears under load without placing any stress on the substrate 12.

Figure 4:
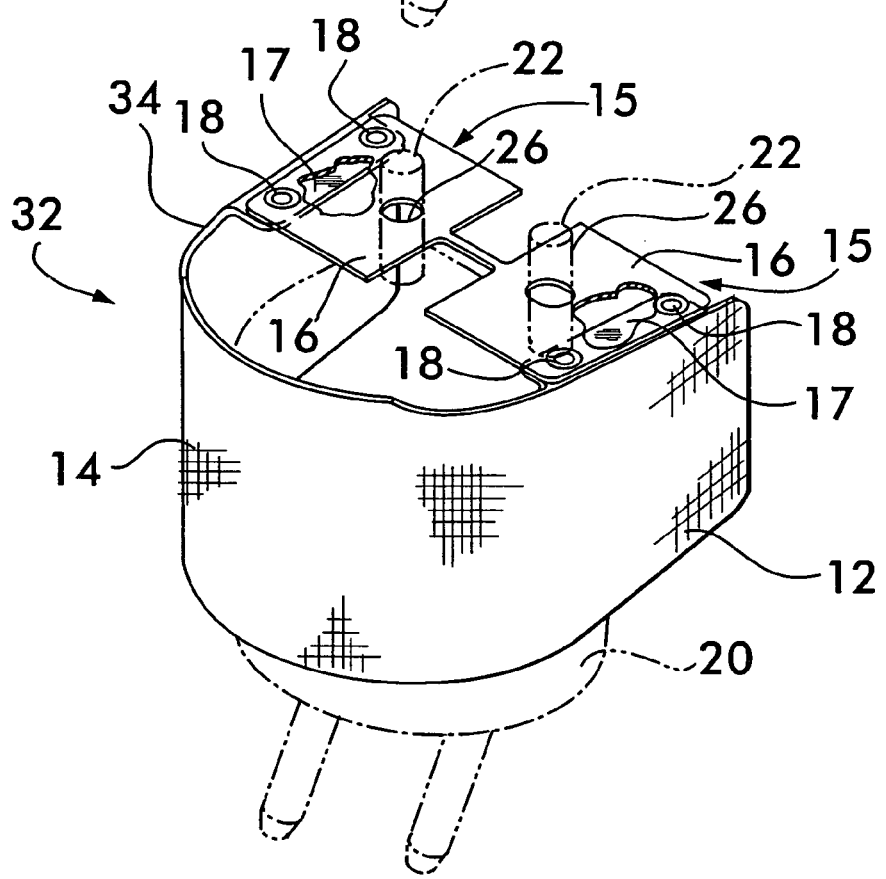
FIG. 4 is a perspective view of an embodiment of a heat shield mounted on an engine block.

FIG. 4 shows another embodiment 32 of a heat shield according to the invention. Heat shield 32 again comprises a substrate 12 preferably formed of a woven glass fiber mat that has a reflecting surface 14. Metal foil, such as aluminum, is preferred for the reflecting surface. An attachment member 15 is attached to the substrate 12 at two positions in spaced relation to one another along a common edge 34. attachment member 15 comprises a tab 16 attached to the substrate 12, for example by rivets 18 engaging hinge elements 17 and holds the substrate in a curved shape that surrounds the engine mount.

Heat shields according to the invention provide a robust and effective device for blocking both conductive and radiative heat transfer to an engine mount, and thereby protecting the mount from accelerated deterioration due to excessive heat exposure.

What is claimed is:

1. A heat shield adapted to protect an engine mount, said engine mount being positionable between an engine and a support frame, said heat shield comprising:
   a substrate positionable substantially surrounding said engine mount, said substrate having a heat reflecting surface facing outwardly away from said engine mount to block radiant heat transfer; and
   a flexible attachment member attached to said substrate, said attachment member being formed of a heat insulating material and being positionable relatively to said engine mount for fixing said substrate in said position surrounding said engine mount, said attachment member reducing conductive heat transfer to said engine mount.

2. A heat shield according to claim 1, wherein said substrate comprises a woven glass fiber mat and said reflective surface comprises a metal foil attached to said mat.

3. A heat shield according to claim 1, wherein said attachment member comprises a tab formed of a fiber reinforced polymeric matrix.

4. A heat shield according to claim 3, wherein said attachment member comprises a hinge element between said tab and said substrate for hingedly attaching said attachment member thereto.

5. A heat shield according to claim 4, wherein said hinge element comprises a portion of said substrate.

6. A heat shield adapted to protect an engine mount, said engine mount being positionable between an engine and a support frame, a plurality of studs projecting from opposite ends of said engine mount and engaging said engine and said support frame, said heat shield comprising:
   a substrate positionable substantially surrounding said engine mount, said substrate having a heat reflecting surface facing outwardly away from said engine mount; and
   a flexible attachment member attached to said substrate, said attachment member having an aperture therethrough adapted to receive one of said studs for attaching said substrate in said position surrounding said engine mount, said attachment member being positionable relatively to said engine mount for fixing said substrate in said position surrounding said engine mount.

7. A heat shield according to claim 6, further comprising a second attachment member attached to said substrate and being positioned in spaced apart relation to said first named attachment member, said second attachment member having an aperture therethrough for receiving one of said studs.

8. A heat shield according to claim 7, wherein said first and second attachment members are positioned along a common edge of said substrate.

9. A heat shield according to claim 7, wherein said first and second attachment members are both positionable between said engine and said engine mount.

10. A heat shield according to claim 9, wherein said first and second attachment members are comprised of a heat insulating material.

11. A heat shield according to claim 9, wherein said first and second attachment members are both positionable between said frame and said engine mount.

12. A heat shield adapted to protect an engine mount, said engine mount being positionable between an engine and a support frame, said heat shield comprising:
   a substrate positionable substantially surrounding said engine mount, said substrate having a heat reflecting surface facing outwardly away from said engine mount to block radiant heat transfer, said substrate having a curved shape; and
   an attachment member attached to said substrate at at least a first and a second position in spaced apart relation along said substrate, said attachment member being positionable relatively to said engine mount for fixing said substrate in said position surrounding said engine mount, said attachment member holding said substrate in said curved shape.

13. A heat shield according to claim 12, wherein said substrate comprises a woven glass fiber mat and said reflective surface comprises a metal foil attached to said mat.

14. A heat shield according to claim 12, wherein said attachment member is formed of a heat insulating material reducing conductive heat transfer to said engine mount.

15. A heat shield according to claim 12, wherein said attachment member comprises a fiber reinforced polymeric matrix.

16. A heat shield according to claim 12, further comprising first and second hinge elements positioned between said attachment member and said substrate at said first and said second positions respectively for attaching said attachment member thereto.

17. A heat shield according to claim 16, wherein said first and second hinge elements comprise respective first and second portions of said substrate.

18. A method of protecting an engine mount from heat of an engine, said method comprising:
   providing a heat shield comprising a flexible substrate having a heat reflecting surface thereon, said heat shield having first and second attachment members, said attachment members being attached to said substrate in spaced apart relation;

forming said substrate so as to surround said engine mount, said heat reflecting surface facing outwardly from said engine mount; and attaching said first and second attachment members to said engine mount.

19. A method according to claim 18, further comprising forming said substrate into a curved shape.

20. A method according to claim 18, further comprising attaching said first and second attachment members to said engine mount between said engine and said engine mount.

* * * * *